(12) United States Patent
Young et al.

(10) Patent No.: US 6,981,386 B2
(45) Date of Patent: Jan. 3, 2006

(54) SILENCING EQUIPMENT FOR AN AIR-COOLING ASSEMBLY

(75) Inventors: Henry Young, North East, PA (US); Ord Allen Randolph, Erie, PA (US); Alan R. Hamilton, Union City, PA (US); Alexander Antonius Maria Jacobs, Erie, PA (US)

(73) Assignee: General Electric Company, Schenectady, NY (US)

( * ) Notice: Subject to any disclaimer, the term of this patent is extended or adjusted under 35 U.S.C. 154(b) by 34 days.

(21) Appl. No.: 10/888,322

(22) Filed: Jul. 9, 2004

(65) Prior Publication Data

US 2005/0028546 A1 Feb. 10, 2005

Related U.S. Application Data

(60) Provisional application No. 60/486,557, filed on Jul. 11, 2003.

(51) Int. Cl.
*F25D 19/00* (2006.01)

(52) U.S. Cl. .................. 62/296; 454/906; 181/224
(58) Field of Classification Search ................. 62/296, 62/239, 259.2, 186; 454/127, 906; 181/224, 181/225; 417/312, 423.8
See application file for complete search history.

(56) References Cited

U.S. PATENT DOCUMENTS

| | | | |
|---|---|---|---|
| 4,007,388 A * | 2/1977 | Lawyer et al. ................. 310/51 |
| 4,121,683 A | 10/1978 | Kohriyama |
| 4,150,313 A | 4/1979 | Panza |
| 4,531,781 A * | 7/1985 | Hunt et al. ................. 298/22 P |
| 5,124,600 A | 6/1992 | Hedeen |
| 5,125,474 A | 6/1992 | Lee et al. |
| 5,453,647 A | 9/1995 | Hedeen et al. |
| 5,672,052 A | 9/1997 | Ishida et al. |
| 5,775,118 A | 7/1998 | Endo |
| 5,832,674 A * | 11/1998 | Ledbetter et al. .............. 52/58 |
| 6,023,938 A * | 2/2000 | Taras et al. ................... 62/296 |
| 6,062,033 A * | 5/2000 | Choi ........................... 62/296 |
| 6,321,557 B1 * | 11/2001 | Scrivener et al. ............. 62/296 |
| 6,386,966 B1 | 5/2002 | Kuwayama et al. |

(Continued)

FOREIGN PATENT DOCUMENTS

JP 59-217496 A * 12/1984

*Primary Examiner*—Mohammad M. Ali
(74) *Attorney, Agent, or Firm*—William Scott Andes; Enrique J. Mora; Beusse, Brownlee, Wolter, Mora & Maire, P A

(57) ABSTRACT

Silencing equipment is provided for an air-cooling assembly in a large off-road vehicle having wheels, traction motors for the wheels that operate in a motoring mode to propel the vehicle and a power generating dynamic braking mode, resistor grids for dissipating the dynamic braking power, and a blower for moving cooling air past the grids to cool them. The silencing equipment may include a resistor grid housing 24 and at least one upper inlet 22 for passing cooling air to the interior of the housing. The inlet includes noise-absorbing material. A conduit 28 is provided for directing cooling air from the upper inlet through a transition chamber to reach the blower and at least one resistor grid in the housing. The conduit is lined with noise-absorbing material. A removable cover 30 is provided for the conduit for accessing the air blower in the housing through the transition chamber, whereby servicing of the blower may be performed without removal of the entire upper inlet.

19 Claims, 4 Drawing Sheets

U.S. PATENT DOCUMENTS

| | | |
|---|---|---|
| 6,419,576 B1 | 7/2002 | Han |
| 6,470,700 B1 * | 10/2002 | Qiu et al. .................... 62/296 |
| 6,537,490 B2 | 3/2003 | Han |
| 6,591,935 B1 | 7/2003 | Petley |
| 6,595,013 B1 * | 7/2003 | Simeone .................... 62/115 |
| 6,606,876 B1 * | 8/2003 | Giordano .................... 62/244 |
| 6,655,165 B1 * | 12/2003 | Eisenhour .................... 62/296 |
| 6,666,735 B2 * | 12/2003 | Benoit .................... 440/12.5 |
| 6,749,043 B2 * | 6/2004 | Brown et al. ............... 188/3 R |
| 2003/0040933 A1 * | 2/2003 | Chernoff et al. ............... 705/1 |

\* cited by examiner

SILENCING EQUIPMENT FOR AN AIR-COOLING ASSEMBLY

This application claims priority to a U.S. provisional application filed on Jul. 11, 2003, having application Ser. No. 60/486,557, which is incorporated herein by reference.

BACKGROUND OF THE INVENTION

The present invention is generally related to off-road vehicles, and, more particularly, to silencing equipment as may be used in an air-cooling assembly for electrical devices onboard an off-road vehicle.

Large off-road vehicles, such as purveyed by Komatsu America Corporation, may be powered by a diesel-electric drive system, such as provided by the assignee of the present invention. The drive wheels of such vehicles may be powered by electric traction motors, which in turn receive electrical power from a diesel-electric generating set. It is known to utilize the drive wheel motors for these vehicles in a braking mode of operation wherein the motors function as electrical generators for retarding the forward progress of the vehicle.

The electrical energy generated by the drive wheel motors/generators may be converted to heat in one or more dynamic braking resistor grids, and the heat is exhausted to the ambient by way of cooling air circulated through the resistive grids. During this mode of operation, the flow of cooling air may generate a significant amount of sound energy in the audible range. It is necessary and desirable to muffle that sound energy for the safety and comfort of the vehicle operator as well as reduce noise impact to the surroundings and also to comply with various regulations and vehicle specifications. Resistor grid silencing equipment must function to reduce noise emission while avoiding any impact on the efficiency of the heat dissipation from the resistor grids. In addition, such equipment must meet various dimensional constraints in order to meet operational and ergonomic considerations necessary for safe and efficient operation of the vehicle, such as providing an unimpeded view to the operator of a vehicle side mirror.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
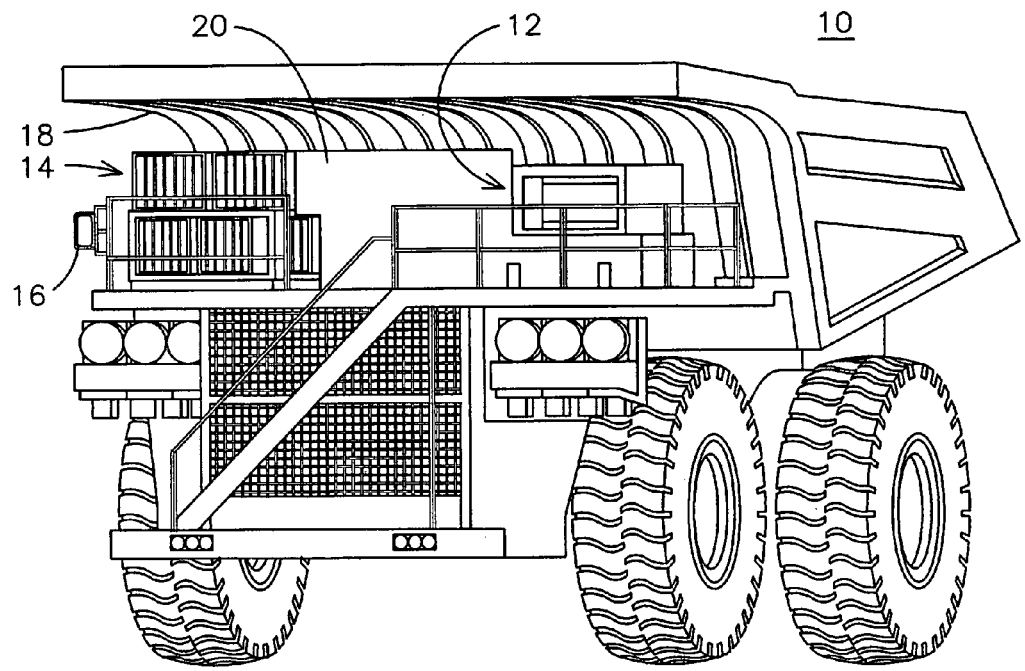
FIG. 1 illustrates an exemplary off-road vehicle that may benefit from aspects of the present invention.

FIG. 1 shows a graphical representation of an exemplary off-road vehicle 10 that may benefit from aspects of the present invention. One type of vehicle contemplated by the present invention includes by way of example a large off-road vehicle, such as may be used in mining and/or construction applications. FIG. 1 in part illustrates a cabin 12 for accommodating an operator of the vehicle. FIG. 1 also illustrates an exemplary location for cooling/silencing equipment 14 (hereinafter referred to as silencing equipment) for resistor grids that may be part of the propulsion system of the vehicle. FIG. 1 may be used for appreciating some of the physical constraints faced by the designers of the silencing equipment 14. For example, the footprint of the silencing equipment 14 should not block the view to the operator of a side mirror 16. It is noted that the footprint of silencing equipment 14 is also constrained at a rear location by a dump body 18 and at an inboard location by a controller enclosure 20. To prevent recycling of the heated discharge air into various air inlets in the vehicle, in one exemplary embodiment, the exhaust air from the resistor grids should be directed to an outboard location relative to the body of the vehicle.

Figure 2:
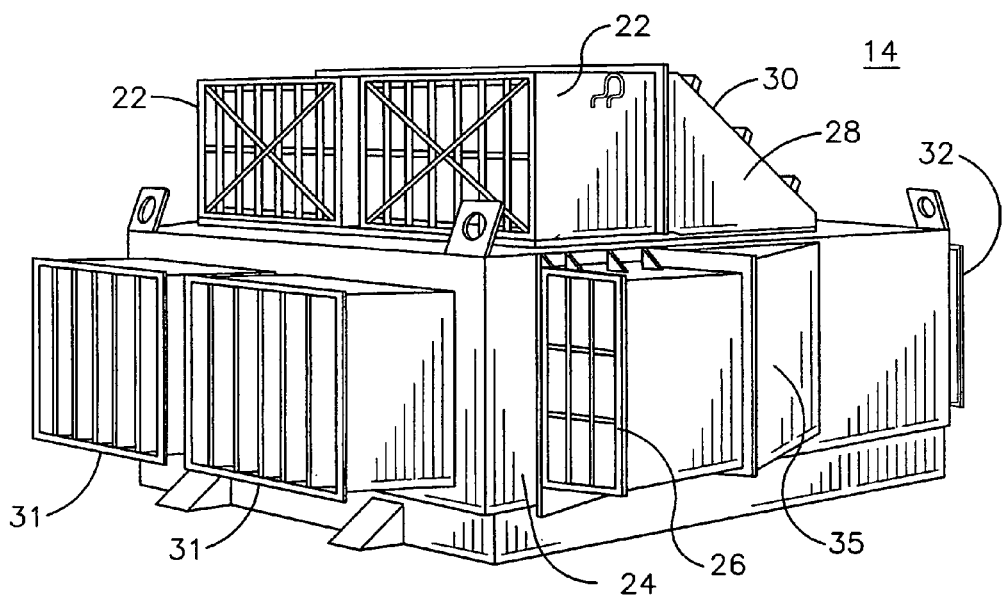
FIG. 2 shows an isometric view of one exemplary embodiment of cooling/silencing equipment in accordance with aspects of the present invention.
Figure 4:
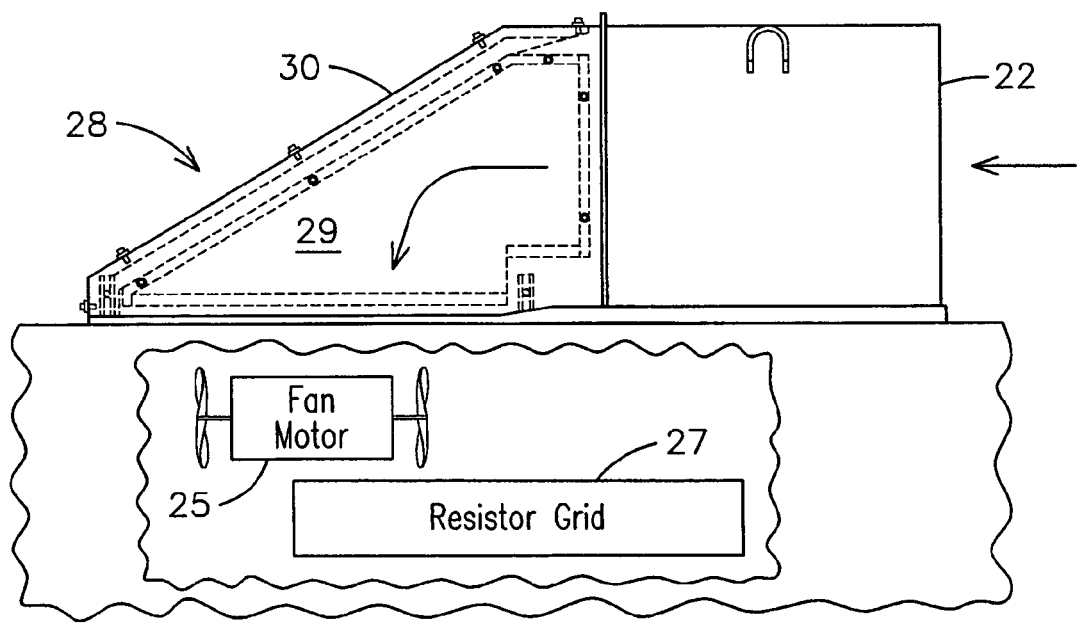
FIG. 4 is a side view of a ducted conduit having a removable hatch for allowing service personnel accessibility to components housed within the resistor grid housing.

FIG. 2 shows an isometric view of one exemplary embodiment of silencing system 14 in accordance with aspects of the present invention. A pair of upper inlets 22 including noise-absorbing baffles (e.g., silencers) allows cooling air to enter the interior of a resistor grid housing 24 that includes an electric blower 25 (FIG. 4) and one or more resistor grids 27 (FIG. 4). In addition, an inboard inlet 26 and an outboard inlet (not shown) each including noise-absorbing baffles allow additional cooling air to enter housing 24.

As also shown in FIG. 4, a first ducted conduit 28 provides a transition chamber 29 (FIG. 4) for directing the cooling air from upper inlets 22 (initially flowing in a generally horizontal plane) to a vertical plane into the blower inlet, through the blower and through the resistor grids. In one exemplary embodiment, the ducted conduit includes a removable hatch 30. This aspect of the invention allows service personnel with user-friendly accessibility to the electric blower 25, such as may include a blower motor, one or more fans, etc., that may be housed within the resistor grid housing. By way of example, this provides significant advantages over one known design where no accessible transition chamber is provided. More specifically, a top air inlet in that known design lacks silencers, as the entire top inlet needs to be removed (no removable hatch) for periodic maintenance of the electric blower and the addition of silencers would have dictated burdensome use of a crane in order to remove an entire top inlet with silencers. Thus, aspects of the present invention result in improved accessibility to servicing personnel as well as improved silencing capabilities since the inner walls of conduit 28 are lined with noise absorbing material.

It will be further appreciated in FIG. 2 that a second ducted conduit 35 (e.g., a lateral conduit) in communication with transistor chamber 29 is provided for the inboard inlet 26. This feature provides a distinct advantage over one known design where the tight physical constraints resulting from the relatively large volume of the controller enclosure

20 (FIG. 1) just permitted installation of a relatively short straight-through baffle (e.g., approximately four inches) for that inboard inlet. The second ducted conduit 35 permits a relatively longer noise-absorption path (e.g., about 24 inches) for the inboard inlet 26 while providing a lateral transition chamber for directing the cooling air into the blower inlet and over the resistor grids. The lateral transition chamber provided by the second ducted conduit 35 allows approximately a 90-degree turn to the cooling air passing from the inboard inlet 26.

Figure 3:
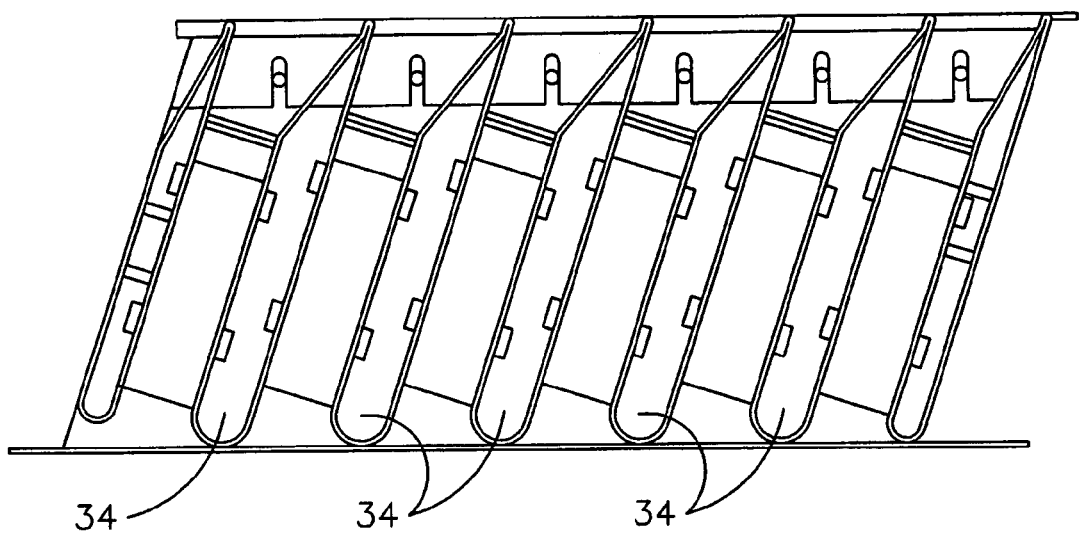
FIG. 3 is a top view of discharge baffles or vanes having a deflection angle for deflecting exhaust air in a preferred direction and providing noise-absorbing material for the outlets of the dynamic brake grid resistors.

FIG. 2 further illustrates a pair of front exhaust outlets 31 for discharging exhaust air (e.g., heated air) from the resistor grids. A pair of rear outlets 32 provides additional means for discharging exhaust air from the resistor grids. In another aspect of the present invention, angling or tilting (e.g., approximately 20 degrees in one exemplary embodiment) is provided to a plurality of discharge baffles or vanes 34 (FIG. 3) in the air exhaust outlets of the silencing equipment. This feature prevents recycling of the heated discharge air into various air inlets in the vehicle. In one known implementation, the baffle design consists of a straight through (e.g., non-angled) baffle design that requires external louvers for directing the exhaust air in the desired exit direction (e.g., outboard relative to the body of the truck). However, the addition of external louvers adds approximately four inches in length to each applicable side of the silencing equipment without providing a corresponding increase in the length of the acoustical attenuation path since the add-on louvers do not include acoustically absorbing material.

The inventors of the present invention have recognized an innovative combination of the silencing and air deflecting functions into one structural element. This combination is particularly advantageous since this effectively increases the length of the sound absorption baffles for a given footprint. For example, the use of a deflection angle for the exhaust silencing baffles results in a physical length of the baffles that corresponds to the hypotenuse of a triangle and this provides an incremental baffle length as opposed to a non-angled baffle design. In one exemplary embodiment, this feature allows for reducing the footprint of the equipment by approximately four inches on each applicable side (e.g., front and rear) of the silencing equipment. For example, this savings in footprint results due to the elimination of the external louvers previously used for providing the air deflecting function for the exhaust outlets.

Figure 5:
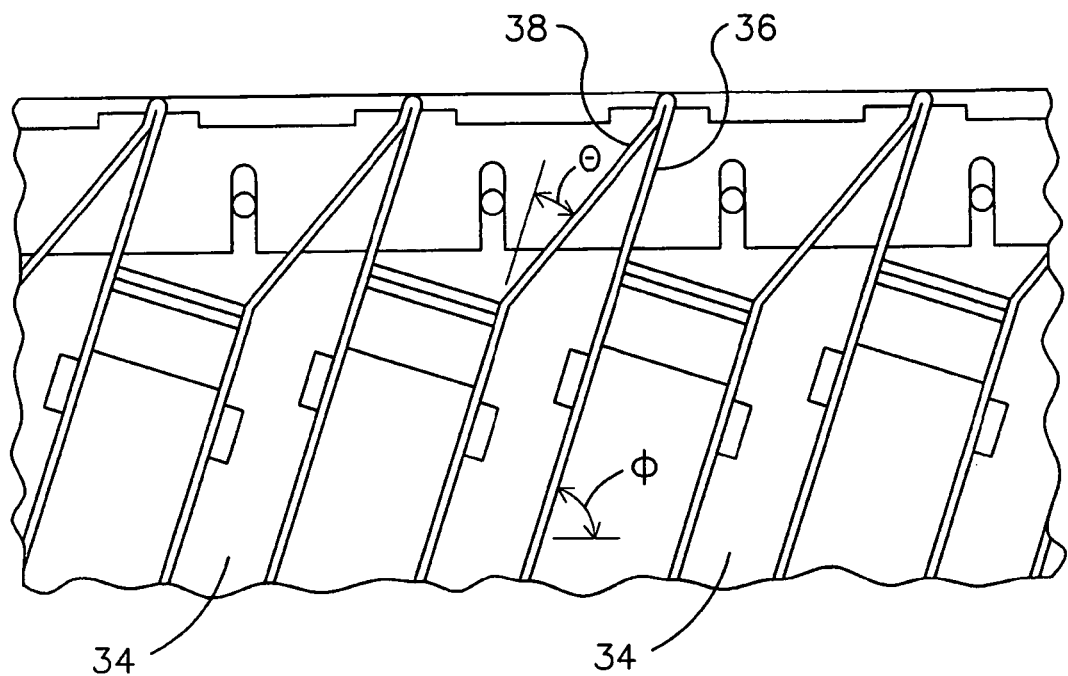
FIG. 5 shows structural details at the exit end of the discharge vanes.

The inventors of the present invention have further recognized that to effectively achieve the air deflection capability provided by the angling of the exhaust vanes 34, a single sided taper is provided at the exit end of the vanes. More particularly, as shown in FIG. 5, assuming a deflection angle ø, a first exit edge 36 of a vane comprises a straight edge that follows the deflection angle ø whereas a second exit edge 38 has a taper (as represented by a taper angle θ configured for reducing pressure drop due to air expansion at the end of the vane. It has been experimentally determined that a single-sided taper allows achieving exhaust air deflection that approximates the deflection angle ø. That is, test data indicates that with a typical double sided taper feature at the end of the vane the deflection angle imparted to the baffles would have to be increased in order to achieve the desired deflection to the exhaust air.

In one known design, the size of the sound-absorbing baffles was typically constrained to a mounting pattern (e.g., a bolt-hole pattern) used for attaching other components of the cooling equipment, such as inlet screens or the outlet louvers. However, such mounting pattern (i.e., dictated by the dimensions of the inlet screens or the outlet louvers) limited the cross-sectional area of the sound-adsorbing baffles and resulted in a reduced open area. A note is made of the delicate balancing typically faced by the silencing equipment designer regarding the amount of baffle material that can be used for silencing (more baffle material results in more sound absorption) versus the amount of open area for the exhaust or inlet (less open area results in more backpressure).

Figure 6:
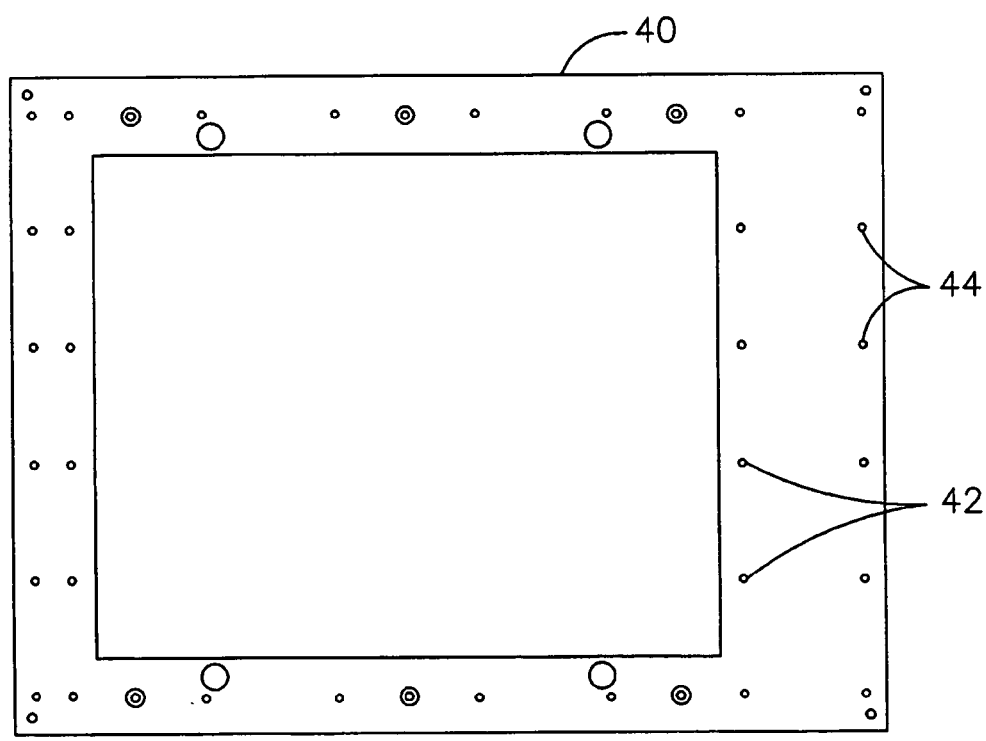
FIG. 6 illustrates a view of an exemplary adaptor plate, particularly useful for a silencing kit for retrofit installations, and including mounting structure for affixing the noise-absorbing baffles.

To address the foregoing considerations, in one exemplary embodiment particularly useful for retrofit installations, an adaptor plate 40, as exemplary illustrated in FIG. 6, is used for installing the noise-absorbing baffles. The adaptor plate 40 may be mounted to a pre-existing mounting pattern on the housing. Thus, adaptor plate 40 includes a first mounting pattern 42 that matches the pre-existing mounting pattern on the housing. Adaptor plate 40 further includes a second mounting pattern 44 for a corresponding silencer. The second mounting pattern 42 is configured to support a sufficiently large silencer cross-sectional area for reducing backpressure while providing a given level of sound attenuation.

This provides advantageous versatility to the equipment integrator since reduced back pressure allows greater cooling flow for the resistor grids resulting in lower grid temperatures. Moreover, use of the adaptor plate in a retrofit installation allows maintaining the structural integrity of the resistor grid housing since no additional mounting pattern needs to be drilled in such a housing. It will be understood that for a brand new design, (a non-retrofit installation) the need of an adaptor plate is diminished since an appropriately dimensioned bolt-hole pattern for the sound-absorbing baffle may be directly constructed on the resistor grid housing without affecting the structural integrity of such housing. The above-described silencing equipment may be supplied in kit form to be assembled at a work site during a retrofit installation.

Figure 7:
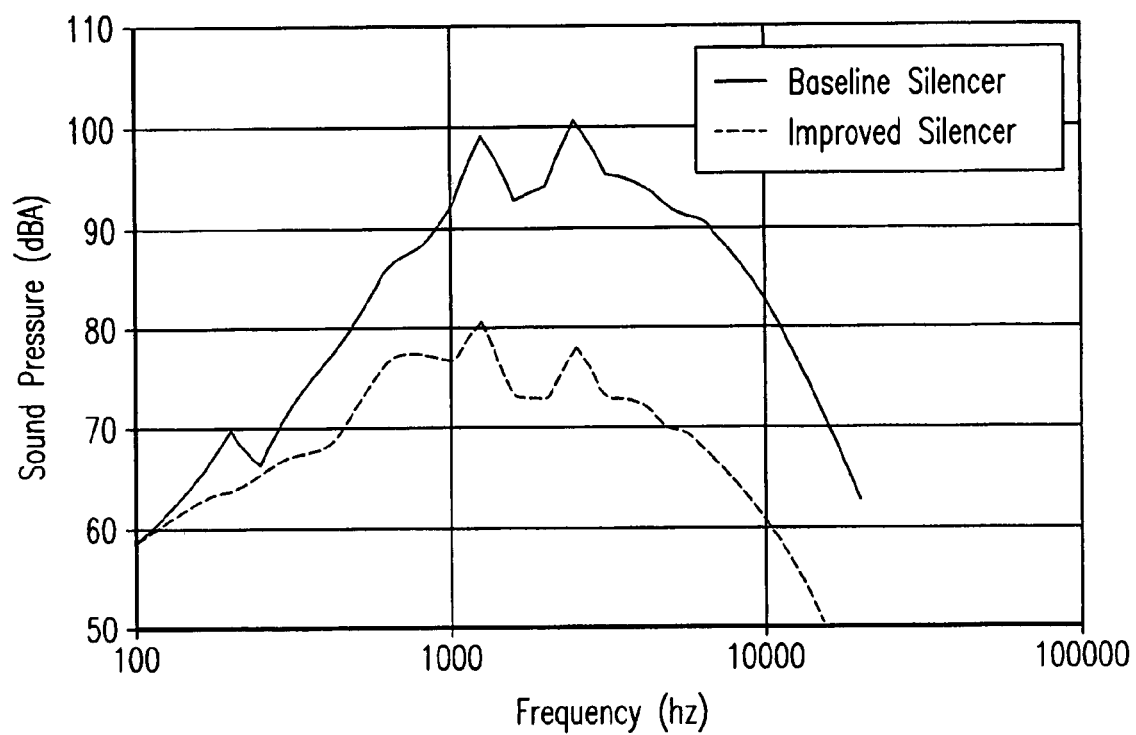
FIG. 7 is a plot of exemplary sound pressure levels as a function of frequency for comparing a baseline known design relative to silencing equipment embodying aspects of the present invention.

FIG. 7 is a plot of exemplary sound pressure levels as a function of frequency comparing a baseline silencer design relative to a silencer embodying aspects of the present invention.

As described above, aspects of the present invention result in improved silencing equipment for resistor grids for large off-road vehicles. Examples of such aspects include but are not limited to:
- accessibility to the motor and blower housed within the silencer housing;
- angling of the discharge vanes from the outlet of the silencer housing to prevent recycling of the heated discharge air into the inlets of the housing;
- unique shape of the vanes, i.e. single-side angled trailing edge blades;
- ducted inlet for reduced size grid housing and greater noise reduction; and
- adapter plates for installing the improved silencing equipment as a retrofit unit.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. Silencing equipment for an air-cooling assembly in a large off-road vehicle having wheels, traction motors for the wheels that operate in a motoring mode to propel the vehicle and generate electrical power in a dynamic braking mode, resistor grids for dissipating the dynamic braking electrical power, and a blower for moving cooling air past the grids to cool them, said silencing equipment comprising:

a resistor grid housing;

at least one upper inlet for passing cooling air to the interior of said housing, said inlet including noise-absorbing material;

a conduit for directing cooling air from said upper inlet through a transition chamber to reach said blower and at least one resistor grid in said housing, wherein said conduit is lined with noise-absorbing material; and a removable cover for said conduit for accessing the air blower for said housing through said transition chamber, whereby servicing of said blower can be performed without removal of the entire upper inlet.

2. The silencing equipment of claim 1 wherein said transition chamber provides a transition to cooling air from a generally horizontal plane to a generally vertical plane.

3. The silencing equipment of claim 1 further comprising at least one outlet for exhausting air from said resistor grid housing, said at least one outlet including a plurality of exhaust vanes positioned at an angle relative to a stream of exhaust air to impart a deflection to said exhaust air into a desired direction, said plurality of exhaust vanes including noise-adsorbing material, whereby said at least one outlet combines air deflection and silencing in a single device.

4. The silencing equipment of claim 3 wherein each exhaust vane includes at its exit end a first edge comprising a straight edge, and a second edge comprising a taper for reducing pressure drop at the end of the vane.

5. The silencing equipment of claim 3 wherein a deflection angle for the exhaust vanes is about 20 degrees.

6. The silencing equipment of claim 1 further comprising an inboard inlet for passing additional cooling air to the interior of said housing, said inboard inlet in communication with said conduit for directing said additional cooling air from said inboard inlet through said transition chamber to reach said blower and said at least one resistor grid in said housing.

7. The silencing equipment of claim 1 further comprising an adaptor plate for a retrofit installation of said silencing equipment, said adaptor plate mounted to a pre-existing mounting pattern on said housing, and including a second mounting pattern for a respective silencer, said second mounting pattern configured to support a silencer cross-sectional area selected for reducing backpressure while providing a given level of sound attenuation.

8. Silencing equipment for an air-cooling assembly in a large off-road vehicle having wheels, traction motors for the wheels that operate in a motoring mode to propel the vehicle and generate electrical power in a dynamic braking mode, resistor grids for dissipating the dynamic braking electrical power, and a blower for moving cooling air past the grids to cool them, said silencing equipment comprising:

a resistor grid housing; and at least one outlet for exhausting air from said resistor grid housing, said at least one outlet including a plurality of exhaust vanes positioned at an angle relative to a stream of exhaust air to impart a deflection to said exhaust air into a desired direction, said plurality of exhaust vanes including noise-adsorbing material, whereby said at least one outlet combines air deflection and silencing in a single device.

9. The silencing equipment of claim 8 further comprising at least one upper inlet for passing cooling air to the interior of said housing, said inlet including noise-absorbing material.

10. The silencing equipment of claim 9 further comprising a conduit for directing cooling air from said upper inlet through a transition chamber to reach said blower and at least one resistor grid in said housing, wherein said conduit is lined with noise-absorbing material; and a removable cover for said conduit for accessing the air blower for said housing through said transition chamber, whereby servicing of said blower may be performed without removal of the entire upper inlet.

11. The silencing equipment of claim 8 wherein said transition chamber provides a transition to cooling air from a generally horizontal plane to a generally vertical plane.

12. The silencing equipment of claim 8 wherein each exhaust vane includes at its exit end a first edge comprising a straight edge, and a second edge comprising a taper for reducing pressure drop at the end of the vane.

13. The silencing equipment of claim 12 wherein a deflection angle for the exhaust vanes is about 20 degrees.

14. The silencing equipment of claim 9 further comprising an inboard inlet for passing additional cooling air to the interior of said housing, said inboard inlet in communication with said conduit for directing said additional cooling air from said inboard inlet through said transition chamber to reach said blower and said at least one resistor grid in said housing.

15. The silencing equipment of claim 8 further comprising an adaptor plate for a retrofit installation of said silencing equipment, said adaptor plate mounted to a pre-existing mounting pattern on said housing, and including a second mounting pattern for a respective silencer, said second mounting pattern configured to support a silencer cross-sectional area selected for reducing backpressure while providing a given level of sound attenuation.

16. A silencing kit for an air-cooling assembly in a large off-road vehicle having wheels, traction motors for the wheels that operate in a motoring mode to propel the vehicle and generate electrical power in a dynamic braking mode, resistor grids for dissipating the dynamic braking electrical power, and a blower for moving cooling air past the grids to cool them, said kit comprising:

at least one inlet for passing cooling air to the interior of a resistor grid housing, said inlet including noise-absorbing material;

a conduit for directing cooling air from said inlet through a transition chamber to reach said blower and at least one resistor grid in said housing, wherein said conduit is lined with noise-absorbing material; and a removable cover for said conduit for accessing the air blower for said housing through said transition chamber.

17. The kit of claim 16 further comprising at least one outlet for exhausting air from said resistor grid housing, said at least one outlet including a plurality of exhaust vanes positioned at an angle for imparting a deflection to exhaust air into a desired direction, said plurality of exhaust vanes including noise-adsorbing material.

18. The kit of claim 17 wherein each exhaust vane includes at its exit end a first edge comprising a straight edge, and a second edge comprising a taper for reducing pressure drop at the end of the vane.

19. The kit of claim 16 further comprising an adaptor plate for a retrofit installation, said adaptor plate connectable to a pre-existing mounting pattern on said housing, said plate including a second mounting pattern for a corresponding silencer, said second mounting pattern configured to support a silencer cross-sectional area sufficiently large for reducing backpressure while providing a given level of sound attenuation.

* * * * *